United States Patent [19]
Helms

[11] Patent Number: 6,000,671
[45] Date of Patent: Dec. 14, 1999

[54] VIBRATION ISOLATION SYSTEM

[75] Inventor: Israel Helms, Coventry, R.I.

[73] Assignee: Advanced Isolation Systems, Ltd.

[21] Appl. No.: 08/792,024

[22] Filed: Jan. 29, 1997

[51] Int. Cl.$^6$ ................................................. F16M 1/00
[52] U.S. Cl. ........................ 248/563; 248/566; 248/636; 248/638
[58] Field of Search ................................. 248/636, 638, 248/631, 562, 346.2, 563, 632, 550, 634, 561, 566, 565, 573, 574, 635; 267/136, 140.5, 141.7, 35

[56] References Cited

U.S. PATENT DOCUMENTS

| | | | |
|---|---|---|---|
| 1,880,280 | 10/1932 | Replogle | 248/563 X |
| 2,597,800 | 5/1952 | Hussman | 248/638 X |
| 2,664,257 | 12/1953 | McNally | 267/136 |
| 3,368,807 | 2/1968 | Thrasher | 248/562 X |
| 3,730,473 | 5/1973 | Pepi . | |
| 3,784,146 | 1/1974 | Matthews . | |
| 3,877,552 | 4/1975 | Higginson et al. | 248/183.2 |
| 4,399,987 | 8/1983 | Cucelli et al. | 248/562 X |
| 4,537,382 | 8/1985 | Beck . | |
| 4,648,577 | 3/1987 | Weber | 248/636 |
| 4,757,980 | 7/1988 | Schubert . | |
| 4,770,396 | 9/1988 | Jouade | 248/562 X |
| 4,821,205 | 4/1989 | Schutten et al. . | |
| 4,858,879 | 8/1989 | Miyamoto et al. | 248/636 X |
| 4,893,800 | 1/1990 | Tabata | 248/562 X |
| 5,000,415 | 3/1991 | Sandercock . | |
| 5,100,096 | 3/1992 | Mizuno et al. | 248/638 |
| 5,285,995 | 2/1994 | Gonzalez et al. . | |
| 5,348,266 | 9/1994 | Gertel et al. . | |
| 5,379,980 | 1/1995 | Houghton, Jr. et al. . | |
| 5,390,892 | 2/1995 | Platus . | |
| 5,456,047 | 10/1995 | Dorka | 248/638 X |
| 5,540,549 | 7/1996 | McGuire | 267/140.13 X |
| 5,549,269 | 8/1996 | Gertel et al. . | |

FOREIGN PATENT DOCUMENTS

| | | | |
|---|---|---|---|
| 278323 | 8/1988 | European Pat. Off. | 267/136 |
| 2001328 | 10/1993 | Russian Federation | 267/136 |
| 1227850 | 4/1986 | U.S.S.R. | 267/136 |
| 1364789 | 1/1988 | U.S.S.R. | 267/136 |

Primary Examiner—Ramon O. Ramirez
Assistant Examiner—Stephen S. Wentsler
Attorney, Agent, or Firm—Merek & Voorhees

[57] ABSTRACT

A vibration isolation system having at least three vibration isolation units. Each of the units preferably has the same general configuration. The isolation units each include a support stand having three (3) adjustable feet for adjustably supporting and leveling the isolation units on the floor of the site of operation of the precision equipment desired to be isolated. The units further include a fluid tight cylinder. The fluid tight cylinder is connected to the support stand via three uniformly spaced rods in such a fashion that allows horizontal movement of the cylinder relative to the support stand. A fluid is disposed in a chamber formed intermediate the fluid tight cylinder and the support stand thereby providing a thin film viscous shear damper for damping excitations having a horizontal component. The fluid tight cylinder is sealed by a diaphragm. A piston is positioned directly above the diaphragm. A pair of stops limit the upward and downward movement of the piston. A variable stiffener is positioned intermediate the lower stop and the piston to variably introduce the horizontal damper. The variable stiffener includes an annular elastomeric member having a circular cross-section. A thin film viscous shear damper is positioned in the fluid tight cylinder for damping excitation in the vertical direction. This damper includes a conically shaped plunger operably associated with a tapered well or cup. At least a portion of the plunger and cup are immersed in a liquid. The vertical damper is connected to the piston via a variable stiffener such that the vertical damper may be completely disconnected from the piston during the measuring stage to thereby avoid the transmission of any vertically oriented vibrations from the floor or otherwise, to the precision instrument. A support plate is connected to the piston for supporting at least a portion of the load of the precision machine. The isolation unit also includes a leveling valve for maintaining the precision machine level.

8 Claims, 7 Drawing Sheets

VIBRATION ISOLATION SYSTEM

FIELD OF THE INVENTION

The present invention is directed to a system for isolating vibration. The present invention is readily adaptable for use with coordinate measuring machines ("CMM") requiring a high level of precision. However, the present invention is in no way limited to use with only CMMs. Rather, the present invention can be readily adapted for use with any device needed to be isolated from vibrations.

BACKGROUND OF THE INVENTION

Various mounting arrangements have been developed for supporting sensitive instrumentation such a CMM, gyrocompasses, electron microscopes and other microprecision equipment or machines. Vibrations negatively affect the efficiency of these machines and hence mounting arrangements typically utilize vibration isolation systems to suppress vibrations and shocks at the site where the microprecision equipment is operated. The vibrations may be the result of: (1) the natural frequency of the surrounding structure; (2) the microprecision equipment itself, e.g., sudden movement of a measuring element in a CMM; and/or (3) vibrations resulting from environmental elements which enter the building where the microprecision equipment is operated. In the absence of vibration isolation equipment, vibrations will be transmitted to the precision equipment having both vertical and horizontal components.

Previously known conventional low frequency pneumatic isolation systems are designed with some form of elastically connected damper (e.g., an auxiliary reservoir with flow restrictors) applied in the vertical direction to improve the dynamics in settling and levelling, and provide some degree of isolation. Such a system is disclosed in U.S. Pat. No. 3,730,473. The effectiveness of such a system is significantly limited. First, the damping characteristics of the system cannot be readily modified, i.e., the damping characteristics are predetermined and are based on the size of the dual chambers (primary and auxiliary reservoirs) and the size of the restrictive passageways connecting the primary and auxiliary reservoirs. There is no simple and efficient means for adjusting the damping characteristics of the isolation system so that it can be used under varying operating conditions. This system is further limited in its ability to facilitate rapid settling of the precision equipment due to acceleration of a component (e.g., measuring or cutting element) of the precision equipment. This system is also limited in its ability to reduce the damping characteristic of the isolation system during the measuring or cutting stage of operation of the precision equipment thereby adversely impacting the isolation efficiency of the system. Moreover, this system is limited in its ability to provide smooth transition of the isolation system parameters between different stages of the cycle to avoid undesirable excitations at the point of measuring or cutting.

OBJECTS AND SUMMARY OF THE INVENTION

An object of the present invention is to provide a novel and unobvious vibration isolation system.

Another object of the invention is to provide a relatively simple and inexpensive isolation system which optimally satisfies the production floor envirornent enabling efficient operation of precision equipment having rapid movement and requiring highly accurate measurements.

A further object of the present invention is to provide an isolation system with improved stiffness-damping capability at the stage of acceleration to facilitate rapid settling.

Yet another object of the present invention is to provide an isolation system which automatically reduces the stiffness and damping characteristics during the measuring or cutting stage to improve isolation efficiency.

Still a further object of the present invention is to provide an isolation system having means to readily adjust the damping characteristic for varying operating parameters.

Yet a further object of the present invention is to provide an isolation system permitting smooth transitions of the isolation system parameters over different stages of the cycle thereby avoiding undesirable excitations during the measuring or cutting stage.

These and other objects of the present invention will be readily apparent upon review of the following detailed description of the invention and the accompanying drawings. These objects of the present invention are not exhaustive and are not to be construed as in any way limiting the scope of the claimed invention.

In summary, a preferred embodiment of a vibration isolation system formed in accordance with the present invention includes at least three vibration isolation units. Each of the units preferably has the same general configuration. The isolation units each include a support stand having three (3) adjustable feet for adjustably supporting and leveling the isolation units on the floor of the site of operation of the precision equipment desired to be isolated. The units further include a fluid tight cylinder. The fluid tight cylinder is connected to the support stand via three uniformly spaced rods in such a fashion that allows horizontal movement of the cylinder relative to the support stand. A fluid is disposed in a chamber formed intermediate the fluid tight cylinder and the support stand thereby providing a thin film viscous shear damper for damping excitations having a horizontal component. The fluid tight cylinder is sealed by a diaphragm. A piston is positioned directly above the diaphragm. Stops limit the upward and downward movement of the piston. A variable stiffener is positioned intermediate the lower stop and the piston to variably introduce the horizontal damper. The variable stiffener includes an annular elastomeric member having a circular cross-section. A thin film viscous shear damper is positioned in the fluid tight cylinder for damping excitation in the vertical direction. This damper includes a conically shaped plunger operably associated with a tapered well or cup. At least a portion of the plunger and cup are immersed in a liquid. The vertical damper is connected to the piston via a variable stiffener such that the vertical damper may be completely disconnected from the piston during the measuring stage to thereby avoid the transmission of any vertically oriented vibrations from the floor or otherwise, to the precision instrument. A support plate is connected to the piston for supporting at least a portion of the load of the precision machine. The isolation units also include a leveling valve for maintaining the precision machine level.

It will be readily appreciated by those of skill in the art, that the thin film viscous shear damper for damping excitations having a horizontal component may be omitted for those applications not requiring such, e.g., low frequency vertical and relatively higher frequency horizontal vibrations. However, where the precision instrument is used on an elevated floor or at shops with powerful horizontal impact equipment, it is preferable to employ the aforementioned horizontal damper. The above summary of the invention describes a preferred form and is not in any way to be construed as limiting the claimed invention to the preferred form.

DETAILED DESCRIPTION OF THE INVENTION

The preferred embodiment will now be described with reference to FIGS. 1 to 9. It should be noted that only one isolation unit is depicted in FIGS. 1 to 9. Typically, at least three such units are employed to isolate a given precision machine such as a CMM. Additional units may be used in various circumstances to accommodate additional work loads. Because the configuration of each of the units is substantially the same, only one such unit need be described in detail.

FIGS. 1 TO 9

Figure 1:
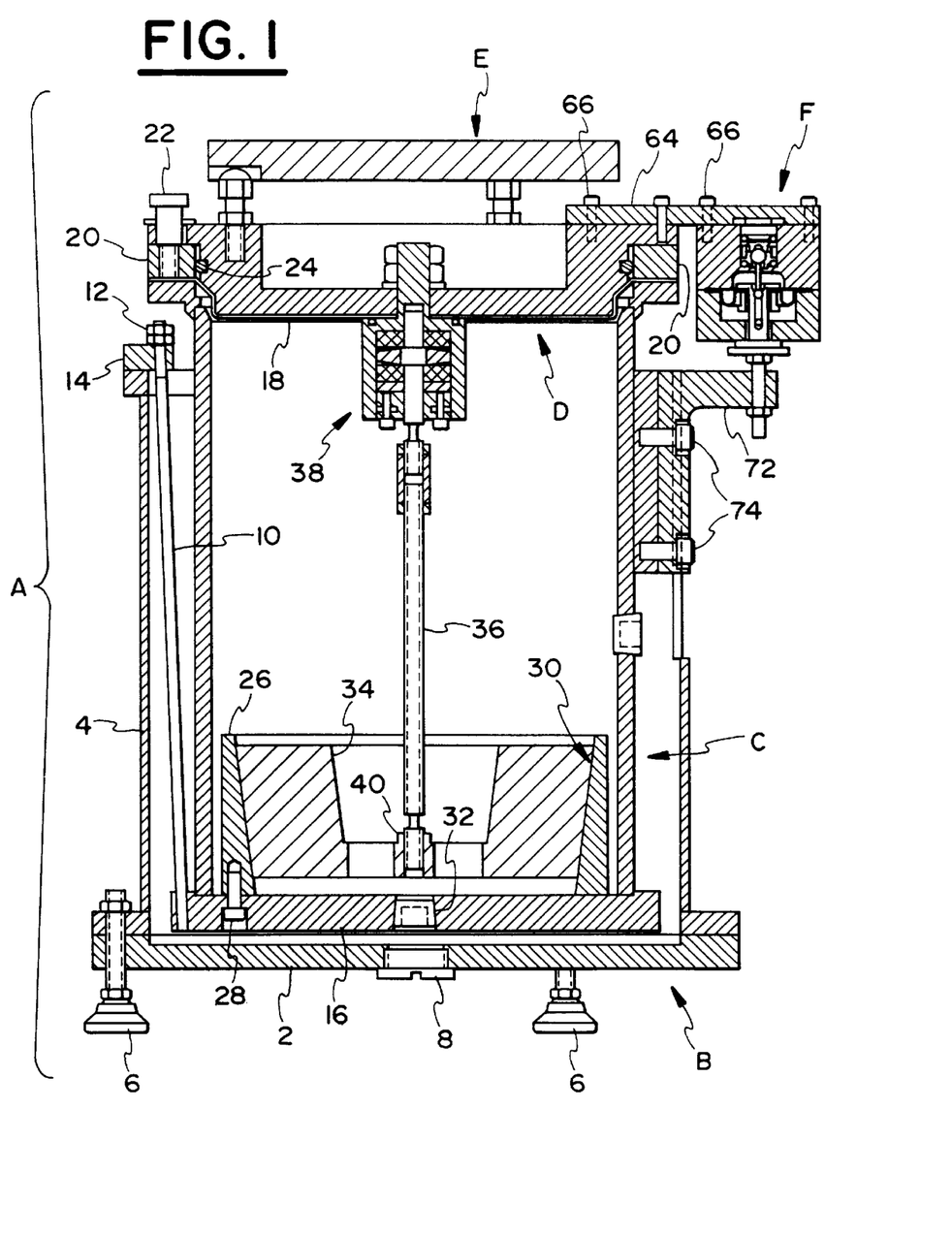
FIG. 1 sectional view of the preferred embodiment of the present invention.
Figure 2:
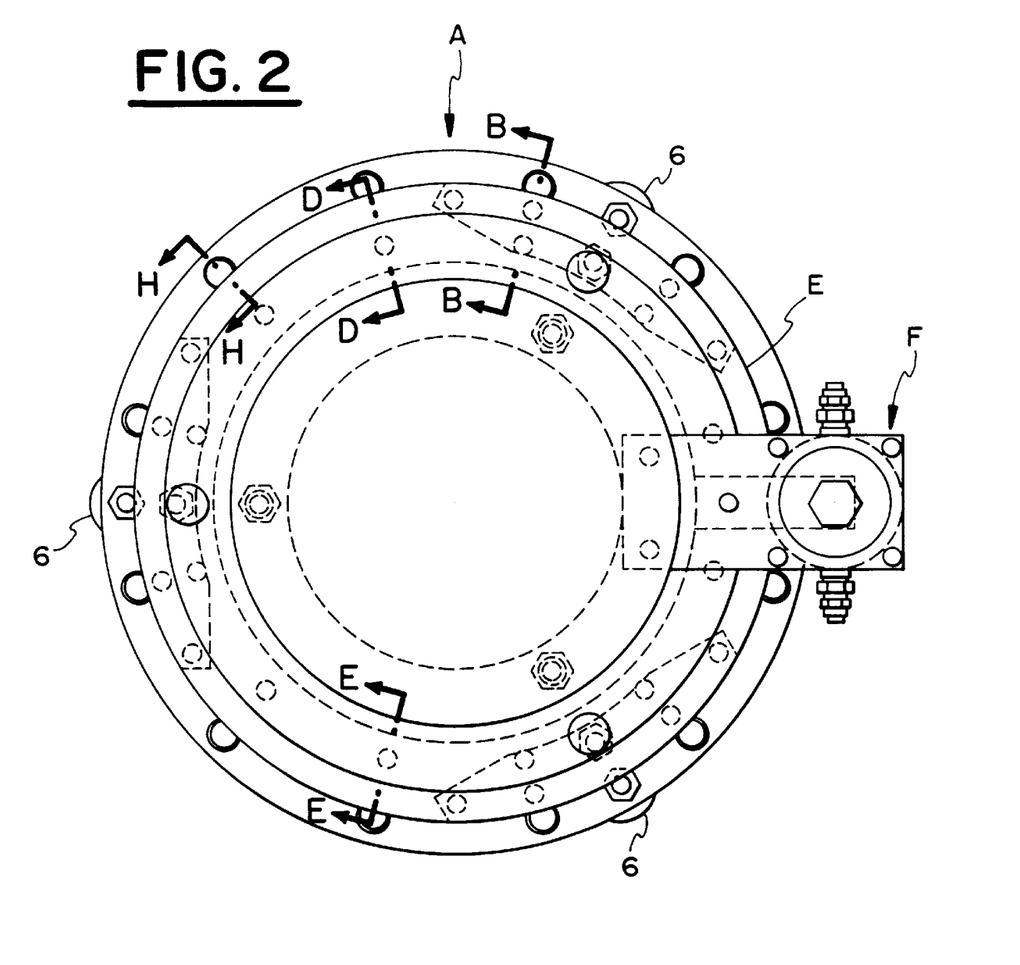
FIG. 2 is a plan view of the preferred embodiment depicted in FIG. 1.

Referring to FIG. 1, the preferred form of an isolation unit A includes a support stand B, a fluid tight cylinder C, a piston D, a support plate E and a leveling valve F. The support stand B includes a generally cylindrical plate 2, a cylindrical collar 4 and three (3) circumferentially spaced adjustable feet 6, only two of which are shown in FIG. 1. It should be noted that under some circumstances support plate E may be omitted. The support stand B adjustably supports the isolation unit A on the floor of the site of operation of the precision machine. The collar 4 is secured to the cylindrical plate 2 by a plurality of fasteners. A seal (not shown) is positioned intermediate the plate 2 and collar 4 to prevent leakage of the liquid contained in support stand B. It should be noted that collar 4 and plate 2 can be made as one-piece. Such a construction would eliminate the need for an intermediate sealing element. Preferably, the liquid is a heavy oil having approximately 1000 cc dynamic viscosity. The support stand B also includes a drainage plug 8.

The fluid tight cylinder C is suspended from support stand B by three uniformly spaced rods 10, only one of which is depicted in FIG. 1. The rods 10 are fixed at the upper end via nuts 12 to the support shelf 14 of collar 4. The bore formed in support shelf 14, through which the rod 10 extends, has a diameter greater than the diameter of the corresponding section of rod 10. This arrangement permits rods 10 to move or swing in the horizontal direction. The opposite end of rods 10 are connected to the base 16 of fluid tight cylinder C. As is readily evident from FIG. 1, the base 16 is immersed in liquid, preferably heavy oil contained in the support stand B. The gap between plate 2 of support stand B and the base 16 of fluid tight cylinder C may be varied to vary the horizontal damping characteristics of the isolation unit via nuts 12. More specifically, by adjusting nuts 12 the distance between base 16 and cylindrical plate 2 may be varied.

Referring to FIG. 1, the fluid tight cylinder C is sealed by a diaphragm 18 at the top thereof. Piston D is mounted directly above the diaphragm 18. (See also FIGS. 6–8). Stops 20 and 22 are provided to limit the movement of piston D in the vertical direction. More specifically, stop 20 is an annular abutment which restricts the downward movement of piston D. FIG. 1 illustrates piston D in its lowermost position. It should be noted that piston D is not normally in contact with stop 20 but rather disposed a predetermined distance above it. Stop 22 includes three circumferentially spaced pins or screws, only one of which is depicted in FIG. 1. Stop 22 limits the upward movement of the piston D. It should be noted that the bores formed in piston D for receiving pins or screws 22 have a greater diameter than that of the corresponding sections of the pins or screws. Hence, the piston D can move in the horizontal direction relative to stop 22 and cylinder C.

Figure 6:
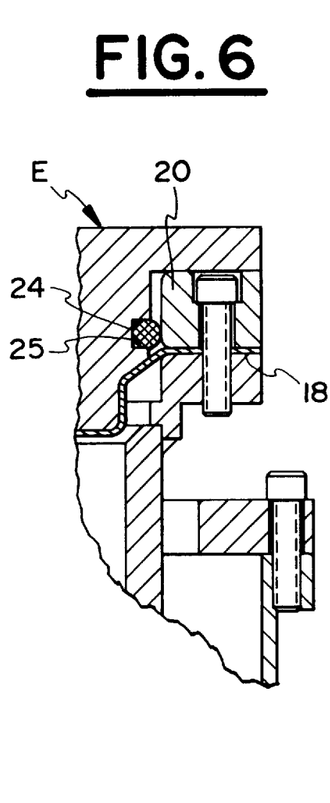
FIG. 6 is a sectional view taken along the lines B—B in FIG. 2.
Figure 7:
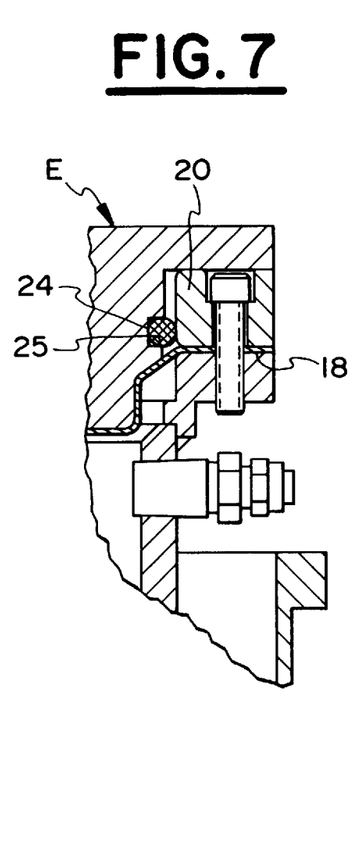
FIG. 7 is a sectional view taken along the lines D—D in FIG. 2.
Figure 8:
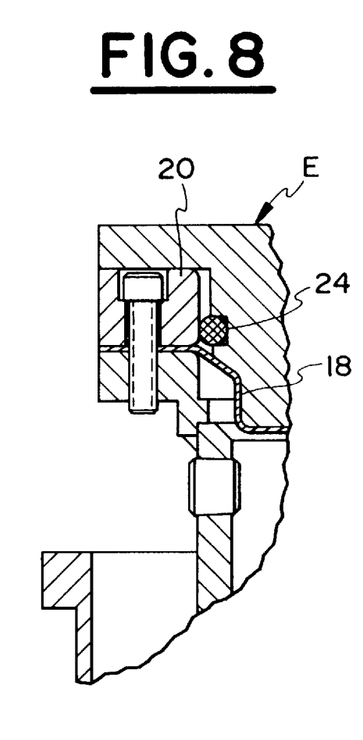
FIG. 8 is a sectional view taken along the lines E—E in FIG. 2.

An elastomeric element 24 is positioned intermediate piston D and stop 22. This is best seen in FIGS. 6 to 8. As is readily evident from FIGS. 6 to 8, piston D includes a square shaped groove 25 for receiving elastomeric ring 24. Ring 24 has a circular cross-section. The circular cross-sectional configuration of element 24 and the square shaped groove 25 in piston D are important because such an arrangement permits element 24 to act as a non-linear stiffener. This feature significantly improves the efficiency of the precision instrument as will be discussed in greater detail in the operation section of the subject specification.

Referring to FIG. 1, a cup or well 26 is positioned in the bottom of the fluid tight cylinder C. Preferably, the cup 26 is fixed to the bottom of fluid tight cylinder C via three pins or screws 28. The inner side wall 30 of the cup or well 26 is tapered. A plurality of openings (not shown) are formed in the lower portion of cup 26. These openings permit liquid in the bottom of the fluid tight cylinder C to flow into the cup or well 26. Preferably, the liquid contained in the fluid tight cylinder C is a heavy oil having approximately a 1000 cc dynamic viscosity. A drainage plug 32 is disposed in the center of base 16.

A conically shaped plunger 34 is received in cup or well 26. The conical shape of plunger 34 is compatible with the tapered inner wall 30. During normal operation of the isolation unit, a gap is present between the exterior wall of plunger 34 and the tapered wall 30 of cup 26. A rod 36 extends between the plunger 34 and piston D. The lower end of rod 36 is connected to plunger 34 via nut 40. The upper end of rod 36 is connected to piston D by non-linear stiffener 38. This latter arrangement is best seen in FIGS. 1 and 9.

Figure 9:
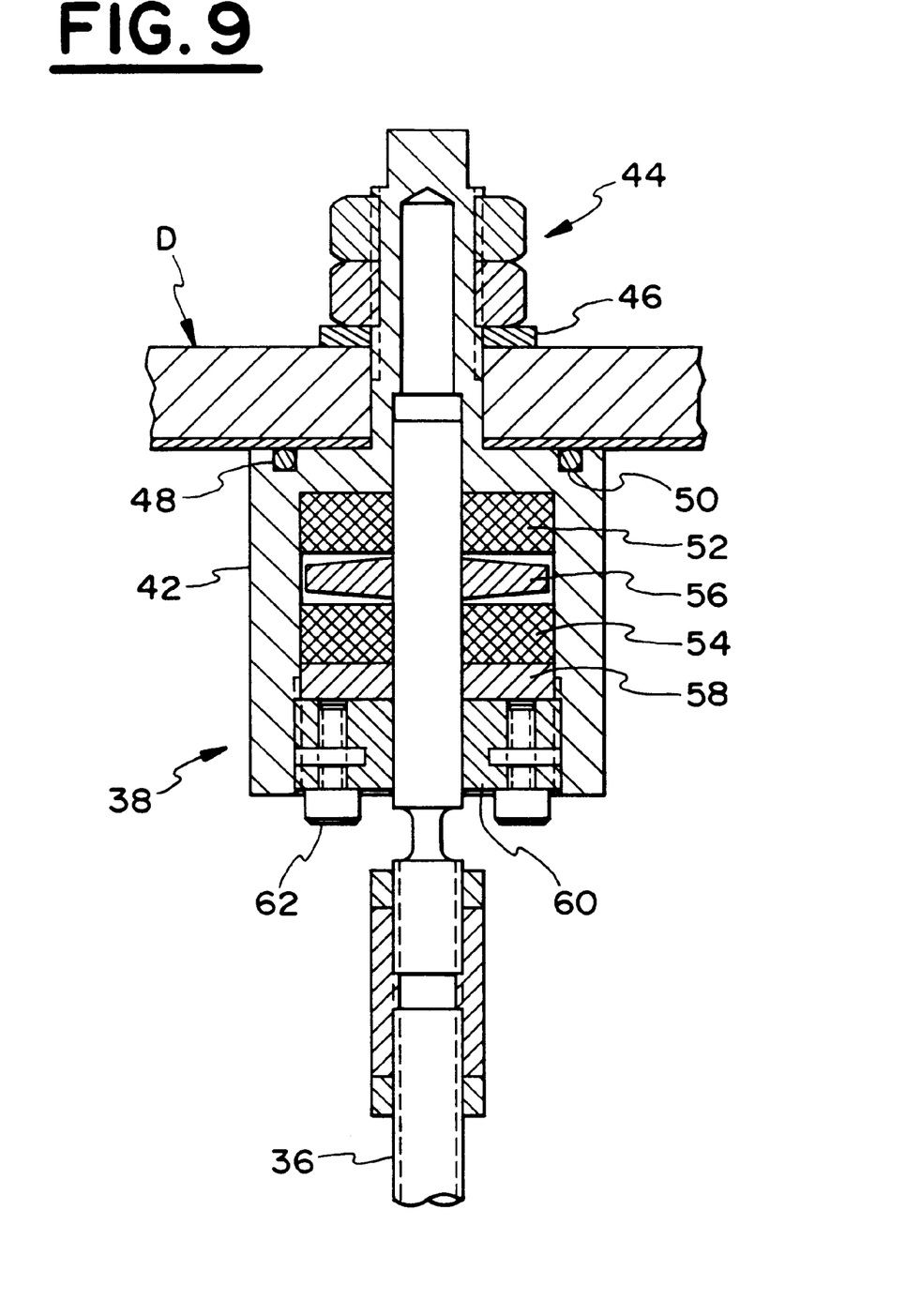
FIG. 9 is an enlarged view of a portion of the preferred embodiment illustrated in FIG. 1.

Referring to FIG. 9, the upper end of rod 36 is disposed in housing 42 which is fixed to piston D via nut 44 mounted over a washer 46. Annular seals 48 and 50 are provided to maintain a fluid tight seal. Inside housing 42 are a pair of annular elastomeric pads 52 and 54. These pads each have a rectangular cross-section as illustrated in FIG. 9. Positioned intermediate pads 52 and 54 is a metal ring 56. However, this ring has a tapered cross-section to provide a non-linear stiffener, the importance of which will be described in greater detail in the operation section of the subject specification. Ring 56 is slightly spaced from both the pads 52 and 54 when the system is not encountering excitation in the vertical direction. It should be noted that under these circumstances the vertical damper is completely disconnected from the piston D and hence the precision machine. This is a significant improvement over previously known devices because no floor excitations having a vertical component are transmitted to the precision machine through the damper. The tapered ring 56 is fixed to rod 36, i.e., ring 56 moves with rod 36. It should be noted that rod 36 is permitted to move relative to housing 42 a distance equal to the gap distance, i.e., the gap between ring 56 and either pad 52 or 54 depending upon whether the movement is in the upward or downward direction. A metal washer 58 is also disposed in housing 42. A threaded retaining cap 60 and a pair of screws 62 cooperate to contain the various elements disposed in housing 42, and set-up the initial preload in the non-linear stiffner.

Referring to FIG. 1, a support plate E is connected to piston D. The support plate E carries at least a portion of the load of the precision machine.

Figure 3:
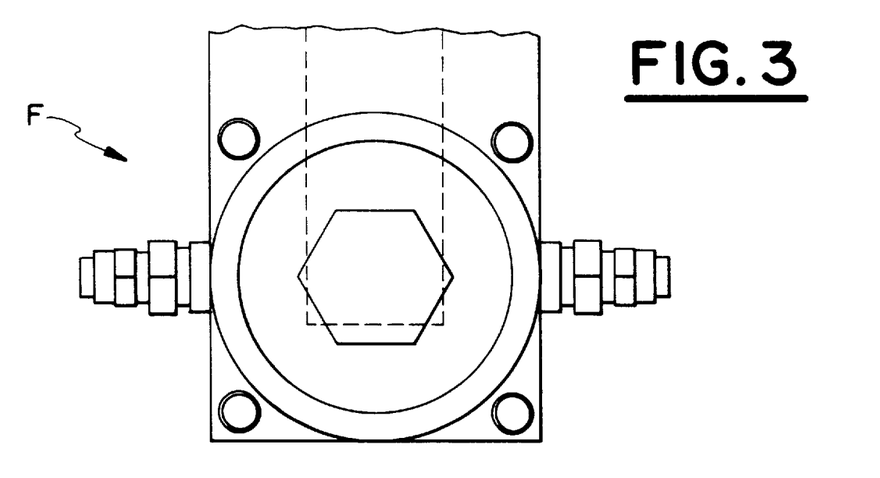
FIG. 3 is a fragmentary enlarged plan view of the preferred form of leveling valve.
Figure 4:
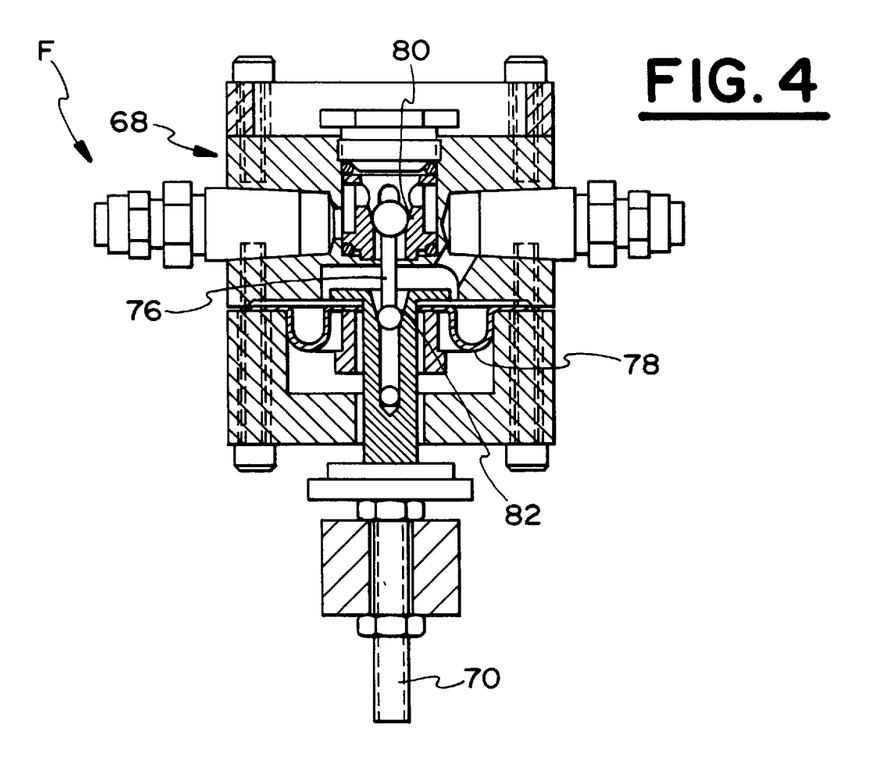
FIG. 4 is an enlarged sectional view of the preferred form of leveling valve.
Figure 5:
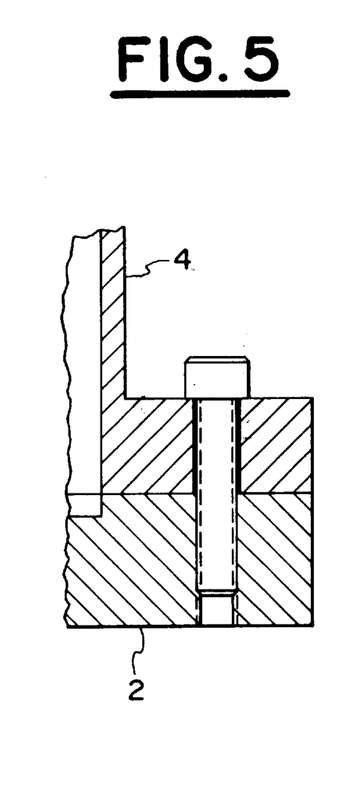
FIG. 5 is a sectional view taken along the lines H—H in FIG. 2.

Referring to FIGS. 1, 3 and 4, leveling valve F is connected between piston D and the fluid tight cylinder C. The connection of the leveling valve F to piston D is accomplished by a plate 64 and a plurality of fasteners 66, best shown in FIG. 1. The housing 68 of leveling valve F is fixed relative to the piston D, i.e., housing 68 moves with piston D. The valve stem 70 is fixed to the fluid tight cylinder C via L-shaped bracket 72 and screws 74. A pair of air lines (not shown) are connected to valve F in a conventional manner. The first line is an air supply line for supplying air under pressure to the valve F. The second line is a supply line extending between the valve F and the fluid tight cylinder C for supplying air under pressure to the fluid tight cylinder C. Valve pin 76 is normally biased in the position illustrated in FIG. 4 via diaphragm 78. In this position both air supply seat 80 and air exhaust seat 82 are closed precluding air from being supplied to or exhausted from the fluid tight cylinder C. In the event that piston D moves downward from its normal operating position, the air supply seat 80 is opened due to the downward movement of housing 68. This results in pressurized air being supplied to the fluid tight cylinder C. The piston in turn resumes to a position wherein the precision machine is once again level. In the event of an upward movement of piston D from its normal operating position, the air exhaust seat 82 opens causing air to be exhausted from the fluid tight cylinder C. This in turn results in piston D moving downward from its normal operating position thereby leveling the precision machine.

OPERATION

The operation of isolation unit A will be described hereinafter with respect to the isolation of a CMM. CMMs typically have high speed moving elements such as a measuring probe. The probe is typically suspended above the body of the CMM by a bridge or cantilever arrangement. This results in a rather large vertical offset between the probe and the body of the CMM. These CMMs impose large moments of excitation on the isolation system owing to the high speed and acceleration of the measuring probe. Also, large vertical forces are applied to the isolation mounts owing to the relocation of payloads.

Both the horizontal and vertical dampers are connected in series to the mass via a variable stiffener. Preferably, both the horizontal and the vertical dampers are thin film viscous shear dampers. The stiffener is variable or adjustable between a completely rigid state and zero ridigity state. When the stiffener is completely rigid the damper in effect is directly connected to the mass providing maximum damping. Maximum damping is desirable during high speed acceleration of the measuring probe of a CMM. When the stiffener has zero rigidity the damper is in effect disconnected from the mass. This is desirable during the measuring stage of a CMM. More specifically, no floor vibrations will be transmitted to the mass via the damper. This improves the efficiency of the isolation system significantly. In addition, because the stiffeners act in a non-linear fashion, settling of the system occurs more rapidly than a conventional spring acting linearly.

Upon rapid acceleration of the measuring probe of the CMM, the piston D will move rapidly in either the upward or downward direction. In turn, housing 42 will move with piston D and relative to rod 36 and tapered ring 56. By this movement, either elastomeric member 52 or 54 will be fully compressed against ring 56 and thereby rigidly connecting the vertical damper to the CMM. This provides maximum damping. The vertical damper is a thin film viscous shear damper. The damping characteristic can be readily varied as the operating parameters dictate by adjusting the gap between the plunger 34 and the inner wall 30 of cup 26 via nut 40. As the measuring probe slows, the damping characteristics are automatically lessened owing to the expansion of either. elastomeric member 52 or 54 from the fully compressed state. Because of the tapered, i.e., conical configuration of the two ends of ring 56 the elastomeric members 52 and 54 are able to act in a non-linear fashion. More specifically, the ends of metal ring 56 are shaped to provide progressively increasing surface area contact between either elastomeric elements 52 or 54 and ring 56. Using an example of an upward force being exerted on piston D, the rod 36 and ring 56 in turn will move upwardly causing deformation of elastomeric ring 52. This deformation will lead to an increase in surface area contact between the upper surface of ring 56 and the lower surface of elastomeric member 52. In this manner, the elastomeric member 52 is able to act in a non-linear fashion. Hence, settling of the system occurs more rapidly. It will be readily appreciated that arrangements other than the conically shaped ends of metal ring 56 and the rectangular cross-section of elastomeric members 52 or 54 may be utilized. The only limitation on such arrangements is to ensure action of the operative elements in a non-linear fashion.

The isolation unit A operates in a similar fashion to isolate vibrations having a horizontal component. Specifically, when the isolation unit encounters vibrations having a large horizontal component, the piston D moves rapidly relative to annular abutment 20 to fully compress a portion of the element 24 thereby fully engaging the horizontal damper providing maximum horizontal damping. Further, the circular cross-section of ring 24 permits the ring to act in a non-linear fashion. Thus, the system is able to settle more quickly along the horizontal component. Once again it is to be noted that arrangements other than a circular elastomeric member may be utilized. What is desirable is the non-linear response.

ALTERNATIVE EMBODIMENT

An alternative embodiment of the present invention will now be described with reference to FIGS. 10 and 11. Elements of the alternative embodiment that are similar to the preferred embodiment illustrated in FIGS. 1 to 9 are given the same reference letter or number with the addition of a prime to signify the alternative embodiment.

Figure 10:
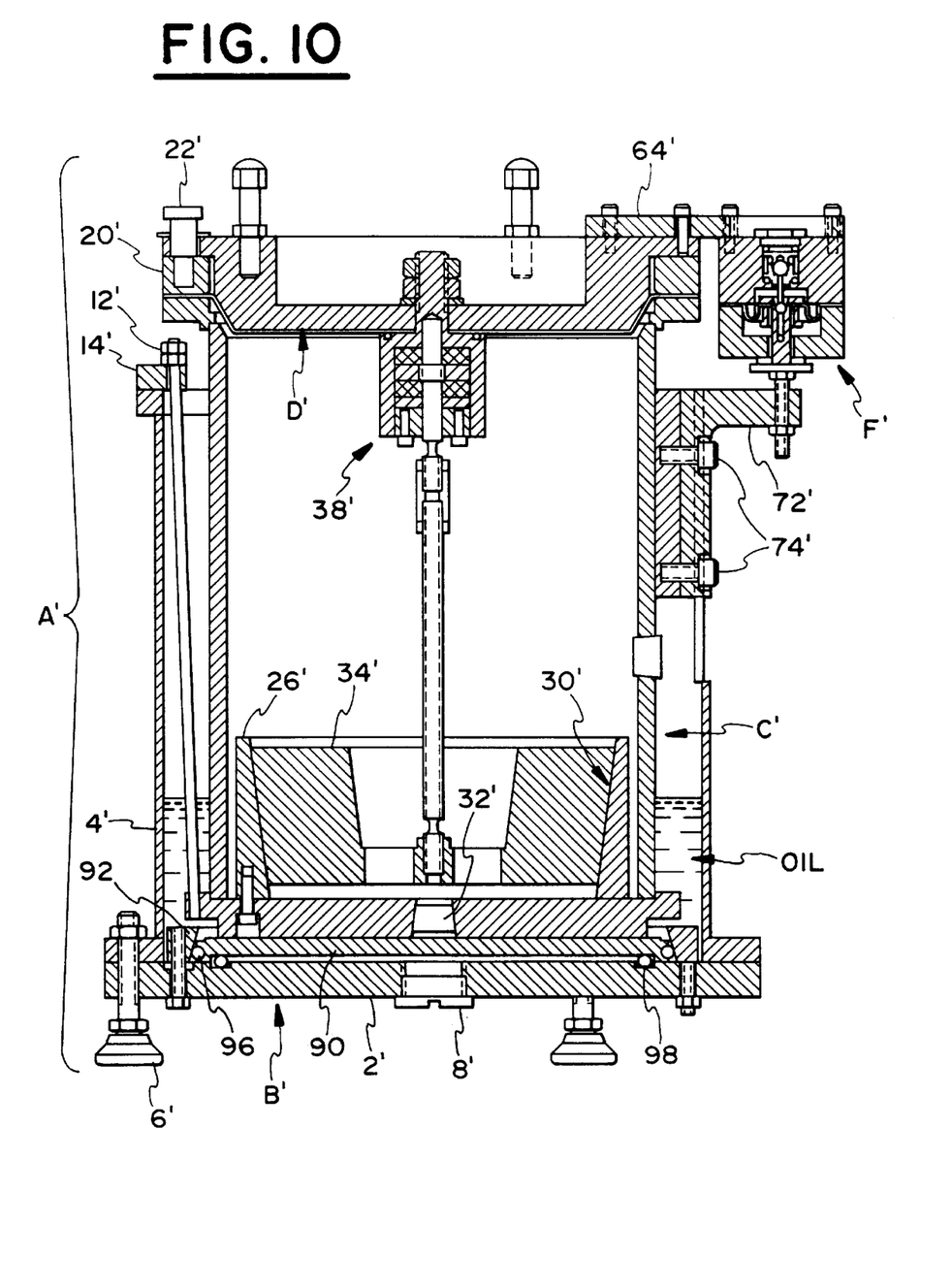
FIG. 10 is a sectional view of another preferred embodiment of the present invention.
Figure 11:
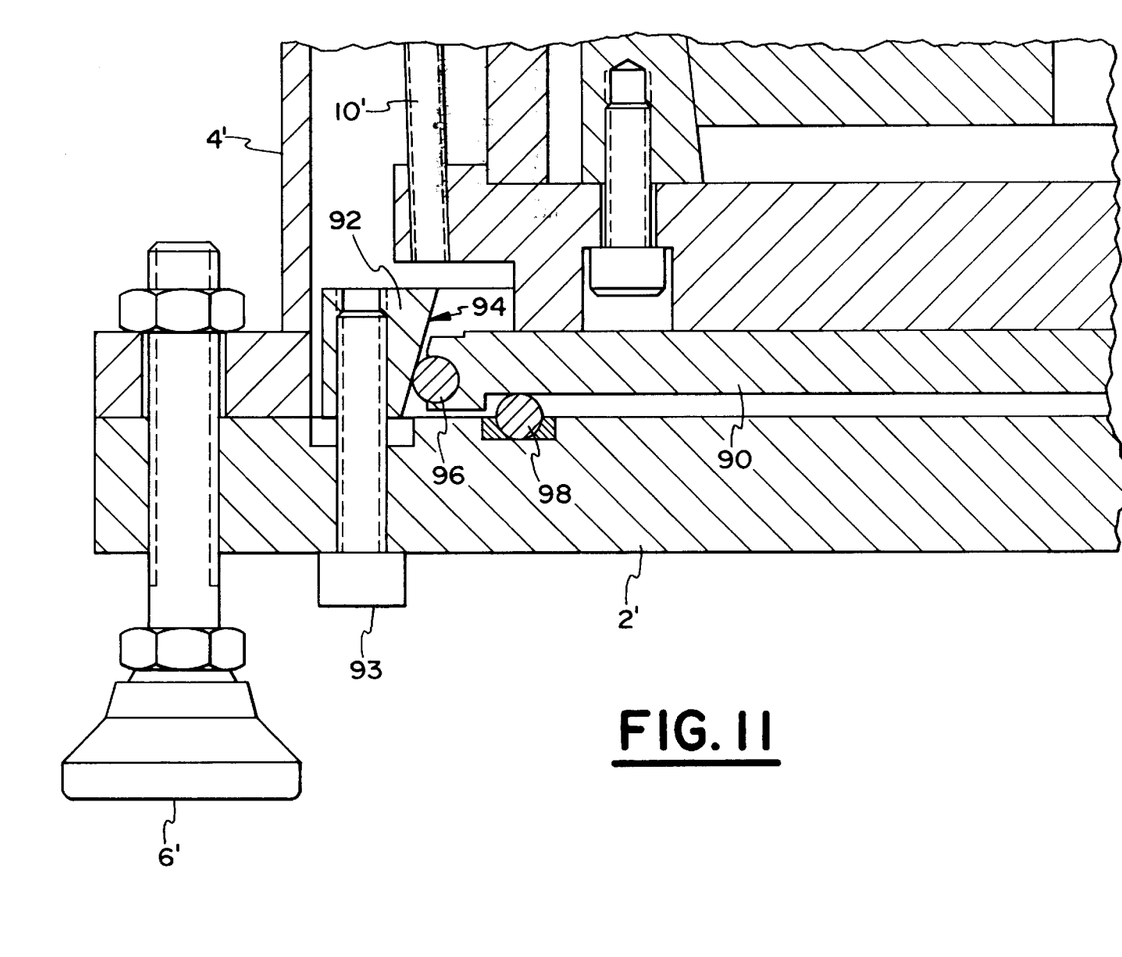
FIG. 11 is an enlarged view of a portion of FIG. 10.

As seen in FIG. 10, the isolation unit A' includes a support stand B', a fluid tight cylinder C', a piston D' and a level valve F'. The vertical damper of the isolation unit A' operates in exactly the same manner as the isolation unit A. Hence, no further elaboration is necessary on this aspect of isolation unit A'. The difference between isolation units A and A' is found in the removal of the elastomeric member 24 and the addition of several elements in cylindrical collar 4'. These elements include a plate 90 which is disposed between cylindrical plate 2' and base 16'. An annular member 92 surrounds the plate 90. A plurality of tightening screws 93' and set screws 97 fix the member 92 to cylindrical plate 2' to preclude relative horizontal movement between these two elements. However, screws 93' and 97 permit adjustment of the member 92 in the vertical direction relative to cylindrical plate 2'. The annular member 92 includes an inner wall 94' which is tapered. An annular elastomeric member 96 is disposed adjacent the tapered wall 94'. The elastomeric member 96 has a circularly shaped cross section and is disposed in a square-shaped notch formed in plate 90. Preferably, plate 90 rests on bearings 98 to permit plate 90 to move freely relative to cylindrical plate 2'.

The operation of the horizontal damper will now be described. Upon exertion of horizontal forces on the piston D', the base plate 16' will move which in turn will cause plate 90 to move with it owing to the viscous forces created by the heavy oil between plate 16' and plate 90. Preferably, the heavy oil has the same viscosity as that used in isolation unit A. While the base plate 16' and plate 90 move as one, there is no horizontal damping. However, upon engagement of elastomeric element 96 with wall 94', plate 90 will move relative to plate 16' resulting in shear damping of vibrations having a horizontal component. When the elastomeric member 96 is fully compressed to a rigid state maximum damping is achieved. The circular cross-section of member 96 permits varying of the horizontal damping in a non-linear fashion, i.e., the horizontal damper is introduced and removed from the system in a non-linear fashion. This is desirable for the reasons previously stated.

By adjusting the height of annular member 92 the damping characteristics can be varied. More specifically, the gap between wall 94' and elastomeric member 96 may be varied to vary the horizontal damping effects of unit A'.

While this invention has been described as having a preferred design, it is understood that it is capable of further modifications, uses and/or adaptions of the invention following in general the principle of the invention and including such departures from the present disclosure as come within the known or customary practice in the art to which the invention pertains and as maybe applied to the central features hereinbefore set forth, and fall within the scope of the invention and the limits of the appended claims.

What is claimed is:

1. An isolation unit for isolating a precision machine from vibrations, comprising:
   a) a support member;
   b) a fluid tight housing operably connected to said support member, said fluid tight housing including upper and lower portions;
   c) a flexible sealing element for sealing said upper portion of said fluid tight housing;
   d) a piston operably associated with said flexible sealing element;
   e) a fluid shear damper for producing a shearing strain for damping vibrations, said fluid shear damper being positioned in said fluid tight housing;
   f) a connector for connecting said fluid shear damper to said piston;
   g) a second housing having a fluid therein, at least a portion of said fluid tight housing being positioned in the fluid of said second housing.

2. An isolation unit as set forth in claim 1, and further including:
   a) means for adjusting the damping characteristics of said fluid shear damper.

3. An isolation unit as set forth in claim 1, wherein:
   a) said fluid shear damper is a vertical damper.

4. An isolation unit as set forth in claim 3, wherein:
   a) said vertical damper includes a conically shaped plunger.

5. An isolation unit as set forth in claim 4, wherein:
   a) said vertical damper includes a cup having an inner wall, said inner wall is tapered, said cup receives said conically shaped plunger such that a gap exists between said conically shaped plunger and said inner wall of said cup.

6. An isolation unit as set forth in claim 5, wherein:
   a) said vertical damper includes a heavy oil filing said gap between said conically shaped plunger and said inner wall of said cup.

7. An isolation unit as set forth in claim 3, further including:
   a) a horizontal damper for damping vibrations having a horizontal component.

8. An isolation unit as set forth in claim 7, wherein:
   a) said horizontal damper is a thin film shear damper.

* * * * *